United States Patent [19]
Trede et al.

[11] Patent Number: 5,873,103
[45] Date of Patent: Feb. 16, 1999

[54] DATA STORAGE MANAGEMENT FOR NETWORK INTERCONNECTED PROCESSORS USING TRANSFERRABLE PLACEHOLDERS

[75] Inventors: Brian Eldred Trede, Woodinville, Wash.; Michael Glen Lotz, Louisville, Colo.

[73] Assignee: Kodak Limited, Hemel Hempstead Herts

[21] Appl. No.: 920,344

[22] Filed: Aug. 27, 1997

Related U.S. Application Data

[60] Continuation-in-part of Ser. No. 650,114, May 22, 1996, Pat. No. 5,832,522, which is a division of Ser. No. 201,658, Feb. 25, 1994, Pat. No. 5,537,585.

[51] Int. Cl.$^6$ ..................................................... G06F 17/30
[52] U.S. Cl. ............................................. 707/204; 707/10
[58] Field of Search ...................... 707/204, 10; 395/858

[56] References Cited

U.S. PATENT DOCUMENTS

| | | | |
|---|---|---|---|
| 5,155,835 | 10/1992 | Belsan | 395/425 |
| 5,218,695 | 6/1993 | Noveck et al. | 395/600 |
| 5,276,860 | 1/1994 | Fortier et al. | 395/575 |
| 5,276,867 | 1/1994 | Kenley et al. | 395/600 |
| 5,313,631 | 5/1994 | Kao | 395/600 |
| 5,367,698 | 11/1994 | Webber et al. | 395/800 |
| 5,564,037 | 10/1996 | Lam | 711/161 |
| 5,581,724 | 12/1996 | Belsan et al. | 395/441 |

OTHER PUBLICATIONS

"Experience With File Migration" by R. D. Christman, Los Alamos National Laboratory, Los Alamos, New Mexico 87545, reproduced by National Technical Information Service, U.S. Dept. of Commerce, Springfield, VA 22161.

"File Migration in The NCAR Mass Storage System" by E. Thanhardt & G. Harano, National Center for Atmospheric Research, Boulder, Colorado, Ninth IEEE Symposium on Mass Storage Systems.

"A Distributed Algorithm for Performance Improvement Through File Replication, File Migration, and Process Migration" by Hac, *IEEE Transaction on Software Engineering* vol. 15, Issue 11, pp. 1459–1470.

"Development Of Omniserver" by. D. A. Arneson, Control Data Corporation, Minneapolis, MN, 1990 IEEE, pp. 88–93.

"Architecture And Implementation of an On–line Data Archive and Distribution System", by. B. Bhasker, M. E. Van Steenberg, B.E. Jacobs, Hughes STX Corp., Lanham, MD, Proceedings Twelfth IEEE Symposium on Mass Storage Systems. Cat. No. 93CH3246-6. pp. 177–182.

"Potential Benefits of File Migration in a Heterogenous Distributed File Systems" by R. T. Hurley, S.A. Yeap, J. W. Wong, J.P. Black, Proceedings ICCI '93, Fifth International Conference on Computing and Information, Cat No. 93Th0563–7, pp. 123–127.

*Primary Examiner*—Paul R. Lintz
*Attorney, Agent, or Firm*—Duft, Graziano & Forest, P.C.

[57] ABSTRACT

The data storage management system provides the capability to move and/or copy the placeholder files from one file server volume to another file server volume, even if the destination file server volume resides on a different file server. This is accomplished by the use of unique and immutable migration keys which are included in the placeholder entries to identify the location of the associated data file with absolute certainty. In addition, a duplicate copy of the placeholder catalog file is maintained in the system to prevent loss of file system integrity in the event that the active placeholder catalog file is corrupted. This placeholder data is maintained in a placeholder volume catalog which provides users with a file-system-like view of the placeholder files which reside on the selected volume.

9 Claims, 6 Drawing Sheets

| DATA ITEM | LENGTH IN BYTES |
|---|---|
| PLACEHOLDER VERSION | 2 |
| PLACEHOLDER FLAGS | 4 |
| HSM IDENTIFIER | 8 |
| BAG IDENTIFIER | 8 |
| LOCATION | 4 |
| SECONDARY SIZE | 4 |
| PRIMARY SIZE | 4 |
| MODIFY STAMP | 4 |
| ACCESS STAMP | 4 |
| MIGRATE STAMP | 4 |
| RECALL COUNT | 4 |
| VERIFICATION SIZE | 2 |
| VERIFICATION DATA | 16 |
| TOTAL | 60 |

| DATA ITEM | LENGTH IN BYTES |
|---|---|
| PLACEHOLDER VERSION | 2 |
| PLACEHOLDER FLAGS | 4 |
| HSM IDENTIFIER | 8 |
| BAG IDENTIFIER | 8 |
| LOCATION | 4 |
| SECONDARY SIZE | 4 |
| PRIMARY SIZE | 4 |
| MODIFY STAMP | 4 |
| ACCESS STAMP | 4 |
| MIGRATE STAMP | 4 |
| RECALL COUNT | 4 |
| VERIFICATION SIZE | 2 |
| VERIFICATION DATA | 16 |
| TOTAL | 60 |

DATA STORAGE MANAGEMENT FOR NETWORK INTERCONNECTED PROCESSORS USING TRANSFERRABLE PLACEHOLDERS

CROSS-REFERENCE TO RELATED APPLICATION

This application is a continuation-in-part of a patent application titled "Data Storage Management For Network Interconnected Processors," Ser. No. 08/650,114, filed May 22, 1996, U.S. Pat. No. 5,832,522 which is a divisional of a patent application titled "Data Storage Management For Network Interconnected Processors," Ser. No. 08/201,658, filed Feb. 25, 1994 and issued as U.S. Pat. No. 5,537,585.

FIELD OF THE INVENTION

This invention relates to data communication networks, such as local area networks, that function to interconnect a plurality of data processors with data storage subsystems, and to a data storage management system that automatically migrates low priority data files from the data storage subsystems to backend data storage to provide more available data storage space in the data storage subsystems, with the ability to transfer ownership of these files among the data processors.

PROBLEM

It is a problem in the field of local area networks to provide both adequate data storage resources for the processors connected to the network as well as efficient data storage management capability associated with the data storage subsystems that are connected to the network and which serve the processors. The data storage system described in U.S. Pat. No. 5,537,585 solves this problem by providing a hierarchical data storage capability to migrate lower priority data files from the data storage subsystems that are connected to the network to backend less expensive data storage media, such as optical disks or magnetic tape.

This data storage management system implements a virtual data storage system, comprising a plurality of virtual file systems, for the processors that are connected to the network. The virtual data storage system consists of a first section that comprises a plurality of data storage subsystems, each consisting of file servers and their associated data storage devices, which are connected to the network and serve the processors. A second section of the virtual data storage system comprises the storage server, consisting of a storage server processor and at least one layer of hierarchically arranged data storage devices, that provides backend data storage space. The storage server processor interfaces to software components stored in each processor and file server that is connected to the network. The storage server, on a demand basis and/or on a periodically scheduled basis, audits the activity on each volume of each data storage device that is connected to the network. Data files that are of lower priority are migrated via the network and the storage server to backend data storage media. The data file directory resident in the data storage device that originally contained this data file is updated with a placeholder entry in the directory to indicate that this data file has been migrated to backend data storage. Therefore, when a processor requests this data file, the placeholder entry is retrieved from the directory and the storage server is notified that the requested data file has been migrated to backend storage and must be recalled to the data storage device from which it originated. The storage server automatically retrieves the requested data file using information stored in the placeholder entry and transmits the retrieved data file to the data storage device from whence it originally came. The storage server, backend data storage and processor resident software modules create a virtual storage capacity for each of the data storage devices in a manner that is transparent to both the processor and the user. Each virtual volume in this system can be expanded in extent in a seamless manner to match the needs of the processor by using low cost mass storage devices.

A difficulty with the placeholder concept described in this reference is that a data file, which is denoted by a placeholder, cannot be relocated from one data storage volume to another data storage volume and still retain the ability to be recalled by the data storage management system. In addition, the placeholder catalog files are stored on the file servers associated with the processors which are connected to the network. These placeholder catalog files are therefore potentially exposed to corruption by the users or by other programs extant on the processors. Damage to a placeholder catalog file can cause the data storage management system to be unable to recall data files. Thus, the lack of protection of placeholder catalog files and the portability of placeholders among the data storage volumes are limitations of this data storage management system.

SOLUTION

The above-described problems are solved and a technical advance achieved in the field by the data storage management system of the present invention. The data storage management system provides the capability to move and/or copy the data files from one file server volume to another file server volume, even if the destination file server volume resides on a different file server. This is accomplished by the use of unique and immutable migration keys which are included in the placeholder entries to identify the location of the associated data file with absolute certainty. Since the system users and administrators can rename the storage server, the unique migration key includes timestamp data which relates the storage server name with a specific point in time, which enables the data storage management system to accurately track the present identity of the storage server.

In addition, a duplicate copy of the placeholder catalog file is maintained in the data storage management system to prevent loss of file system integrity in the event that the active placeholder catalog file is corrupted. This placeholder data is maintained in a placeholder volume catalog which provides users with a file-system-like view of the placeholder files which reside on the selected volume. The placeholder volume catalogs are not used for file access purposes, but, instead, are used to ensure that placeholder restoration can be accomplished in the event that the placeholders are corrupted and to provide the users with data volume content viewing. Each placeholder volume catalog resides on the file server to which it pertains and tracks the placeholders for all HSM servers. In this manner, the integrity of the placeholders is ensured.

The data storage management system therefore enables ownership of data files to be transferred among the file servers with the continued use of the placeholder paradigm. This movable placeholder concept is enhanced by the use of placeholder volume catalogs which prevent the loss of placeholder data.

DETAILED DESCRIPTION

Figure 1:
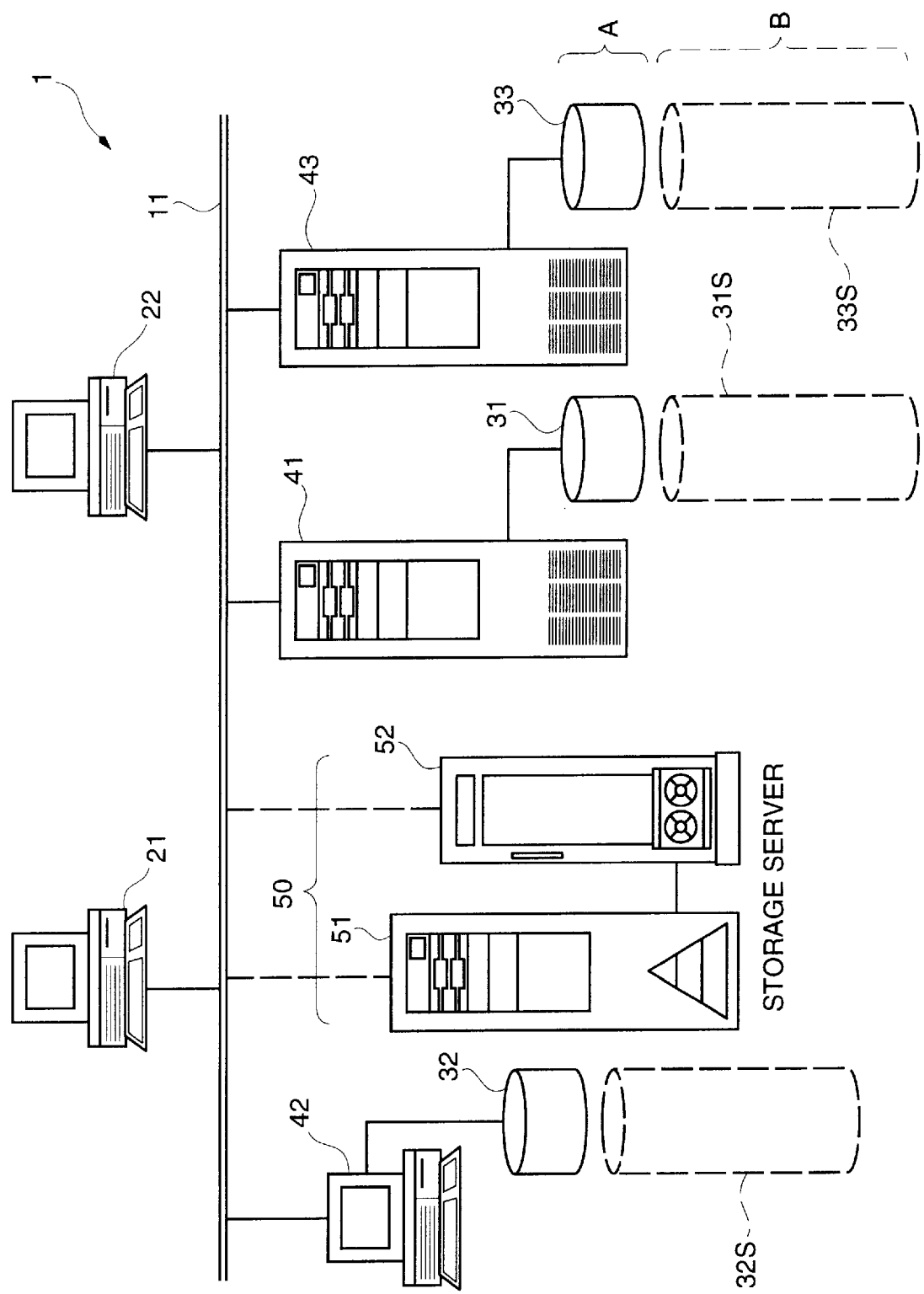
FIG. 1 illustrates in block diagram form the overall architecture of a typical local area network that includes the data storage management system of the present invention.

Local area networks are increasingly becoming an integral feature in the business environment. FIG. 1 illustrates in block diagram form the overall architecture of a typical local area network 1 and the incorporation of the data storage management system of the present invention into the local area network 1. A local area network 1 consists of data communication link 11 and software (not shown) that interconnects a plurality of processors 21, 22 with a number of file servers 41–43. The processors 21, 22 can be personal computers, work stations, mini-computers or any other processing element. For the simplicity of description, all of these devices are described by the generic term "processor". While many of these processors 21, 22 may contain a significant amount of data storage capacity, it is not uncommon for a local area network 1 to be equipped with additional data storage capacity to supplement that of the processors 21, 22 themselves. The data storage devices 31–33 that are connected to the data communication link 11 of the local area network 1 are typically high-speed random access devices, such as high capacity disk drives or even disk drive arrays, to thereby substantially be compatible with the operating speed of the processors 21, 22 and the data communication link 11. Each data storage device 31–33 is included in a file server 41, work station 42 or other type of server 43, which functions as an interface between the network 1 and the data storage device 31–33, such as a disk drive. For simplicity of description, the data storage capacity provided by the file server 41–43 and its associated data storage device 31–33 is referred to as "file server" herein.

Each processor 21 that is connected to the local area network 1 is typically capable of accessing at least one data storage volume on one of these file servers 41 as directly accessible additional data storage space for the use of this processor 21 to store data files. The term data files is used to characterize the various data that can be stored on data storage devices and includes data managed by file servers, databases, application servers, and note systems, which are collectively referred to as "file servers" herein. In this system, the local area network 1 provides a communication fabric over which processors 21, 22 and the file servers 41–43 communicate via a predetermined protocol. The disclosed configuration and implementation of the local area network 1 and its protocol, processors 21, 22, file servers 41–43 as described herein are simply illustrative of the invention and there are numerous alternate embodiments of this system that are possible.

In addition to the processors 21, 22 and the file servers 41–43, the data storage management system 50 is connected to the local area network 1. The data storage management system 50 includes storage server processor 51 which serves to interface the local area network 1 with the backend data storage devices 61–64 (FIG. 4) that constitute the secondary storage 52. The backend data storage devices 61–64, in combination with the file servers 41–43 comprise a hierarchical data storage system. The backend data storage devices 61–64 typically include at least one layer of data storage that is less costly than the dedicated data storage devices 31–33 of the file servers 41–43 to provide a more cost-effective data storage capacity for the processors 21, 22. The data storage management system implements a virtual data storage space for the processors 21, 22 that are connected to the local area network 1. The virtual data storage space consists of a first section A that comprises a primary data storage device 31 that is connected to the network 1 and used by processors 21, 22. A second section B of the virtual memory comprises the secondary storage 52 managed by the storage server processor 51. The secondary storage 52 provides additional data storage capacity for each of the primary data storage devices 31–33, represented on FIG. 1 as the virtual devices 31S–33S attached in phantom to the primary data storage devices 31–33 of the file servers 41–43. Processor 21 is thereby presented with the image of a greater capacity data storage device 31 than is presently connected to the file server 41. The storage server 51 interfaces to software components stored in each processor 21, 22 and file server 41–43 that is connected to the local area network 1.

The storage server processor 51, on a demand basis and/or on a periodically scheduled basis, audits the activity on each volume of each data storage device 31–33 of the file servers 41–43 that are connected to the network 1. Data files that are of lower priority are migrated via the network 1 and the storage server processor 51 to backend data storage media of the secondary storage 52. The data file directory resident in the file server 41 that originally contained this data file is updated with a placeholder entry to indicate that this data file has been migrated to backend data storage. Therefore, when the processor 21 requests this data file, the placeholder entry is retrieved from the data file directory and the storage server processor 51 is notified that the requested data file has been migrated to backend data storage media and must be recalled to the file server 41 from which it originated. In the case of a processor 21, 22 and 42 that interfaces to a user, the storage server 50 may provide the user with a notification, where necessary, that a time delay may be noted in accessing the requested data file. The storage server processor 51 automatically retrieves the requested data file from backend data storage and transmits it to the data storage device 31 from whence it originally came. The storage server processor 51, secondary storage 52 and processor resident software modules create a virtual storage capacity for each of the file servers 41–43 in a manner that is transparent to both the processor 21, 22 and the user. Each virtual volume in this system can be expanded in extent in a seamless manner to match the needs of the processors 21, 22 by using low cost mass storage devices to implement the secondary storage 52.

Hierarchical Storage Management Architecture

Figures 2, 3:
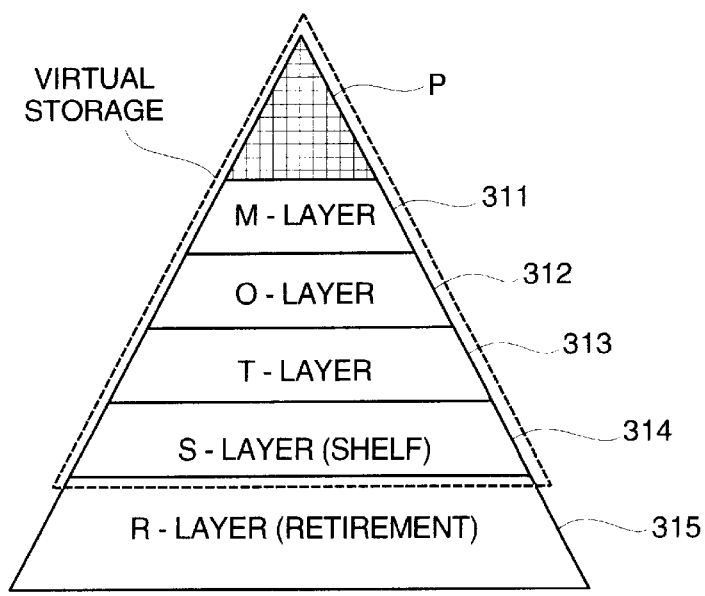
FIG. 2 illustrates in table form the architecture and content of a typical placeholder.
FIG. 3 illustrates in conceptual view the architecture of the hierarchical memory of the data storage management system of the present invention.
Figure 4:
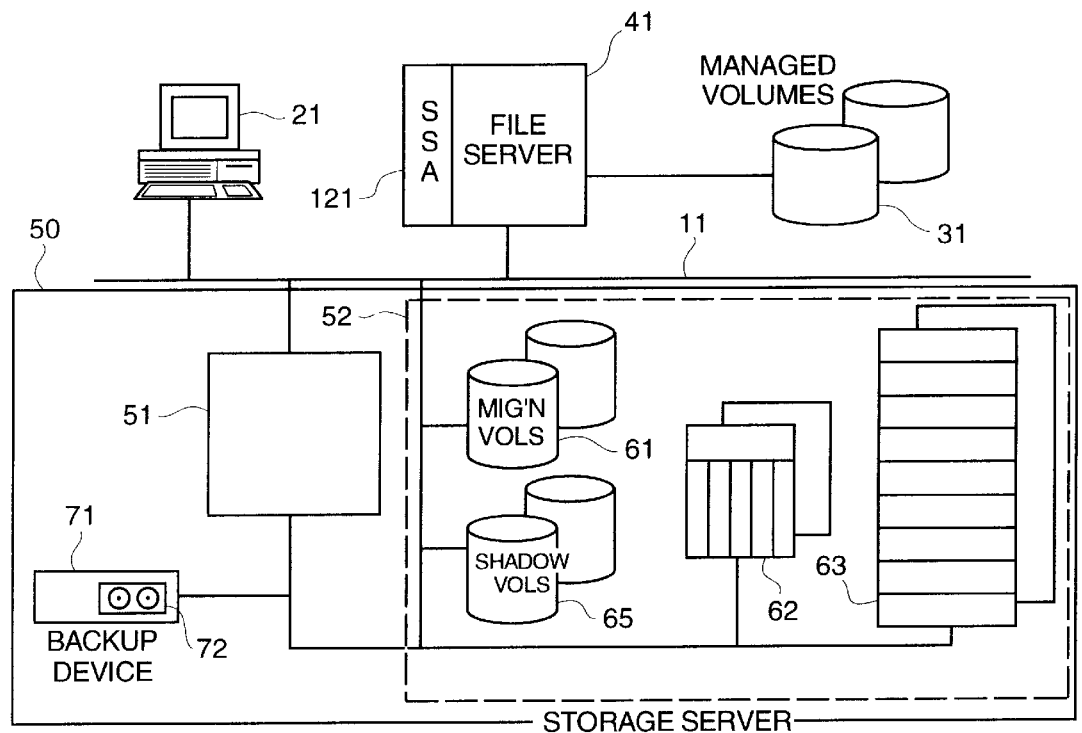
FIG. 4 illustrates a physical implementation of the hierarchical memory of the data storage management system of the present invention.

FIG. 3 illustrates the philosophical architecture and FIG. 4 illustrates one possible hardware implementation of the hierarchical data storage management (HSM) system. The user at a processor 21 interfaces with a primary data storage device P via the network 1. The primary storage device P consists of a file server 41 and its associated data storage device(s) 31, such as a disk drive. The file server 41 manages the data storage media of the associated data storage device 31 in well known fashion. The data storage device 31 is typically divided into a number of volumes, which can be called file server volumes.

As illustrated in FIG. 3, the secondary storage 52 is divided into at least one and more likely a plurality of layers 311–313, generally as a function of the media used to implement the data storage devices 61–64. In particular, the second layer 311 of the hierarchical data storage, which is the first layer of the secondary storage 52, can be implemented by high speed magnetic storage devices 61. Such devices include disk drives and disk drive arrays. The third layer 312 of the hierarchical data storage, which is the second layer of the secondary storage 52, can be implemented by optical storage devices 62. Such devices include optical disk drives and robotic media storage and retrieval library systems. The fourth layer 313 of the hierarchical data storage, which is the third layer of the secondary storage 52, can be implemented by slow speed magnetic storage devices 63. Such devices include magnetic tape drives and robotic media storage and retrieval library systems. An additional layer 314 of the hierarchical data storage can be implemented by the use of a "shelf layer", which can be implemented by manual storage of media. This disclosed hierarchy is simply illustrative of the data storage management concept and the number, order and implementation of the various layers can differ from that disclosed herein.

As can be seen in FIG. 3, data files can migrate from the file server volumes of the first section A of the virtual memory to the data storage devices 61–64 of the second section B of the virtual memory. In addition, these data files can further be relocated from the first layer 311 of the secondary storage 52 to the second 312 and third layers 313 of the secondary storage 52 as a function of the activity of the data file, as indicated in FIG. 3. Further, the data file can be recalled directly to the file server volumes from any layer of the secondary storage 52.

Data Management System Software

Figure 7:
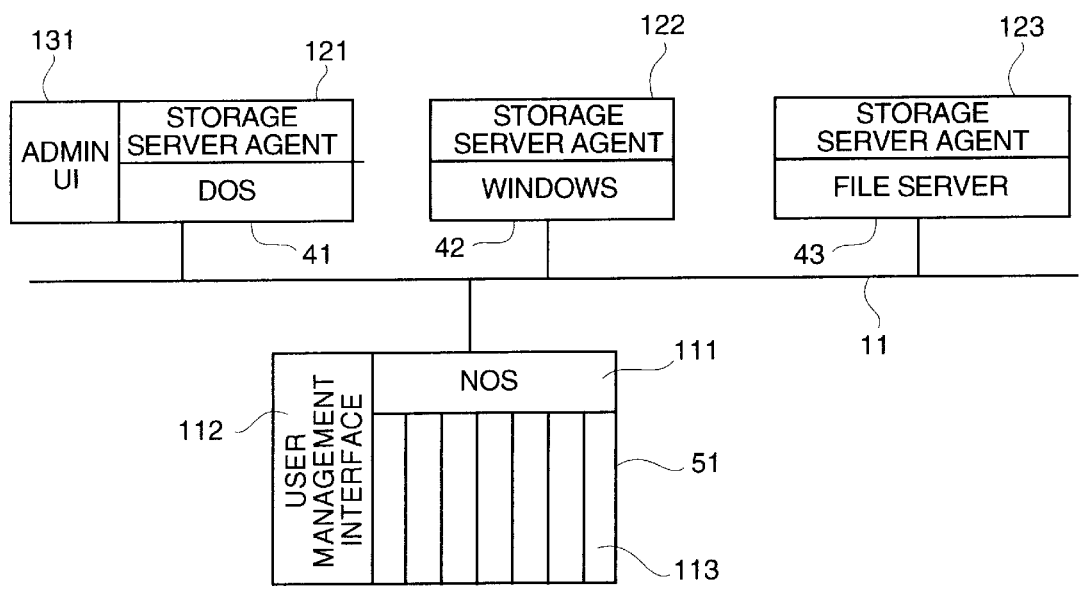
FIG. 7 illustrates in block diagram form the client-server view of the system of the present invention.

The data management system software of the present invention manages the flow of data files throughout the HSM system. The block diagram of FIG. 7 illustrates a conceptual client-server view of the network and the data management system software. The data communication link 11 of the local area network 1 is illustrated having the storage server processor 51 and three file systems 41–43 attached thereto. The storage server processor 51 includes the network operating system 111 as well as the data storage management system software consisting of various media and device management user interfaces 112 and control and services software 113. Each file server 41–43 includes a storage server agent 121–123 and any processor of the network can include and run an administrative user interface 131. The control and services software 113 looks at the HSM system as a set of clients that are connected to the network 1 and which require services from the storage server 50. Each file server 41–43 communicates with the storage server processor 51 via the resident storage server agent software 121–123. Thus, the data management system software is distributed throughout the network and serves to transparently integrate all the elements connected to the network into the data storage hierarchy.

The storage server agent 121–123 represents a component that is installed in each file server 41–43 in the local area network 1 and functions to redirect requests for migrated data files from the file server 41–43 which was the original repository of the requested data file to the storage server 50. The storage server agent 121–123 provides whatever interfaces are required to redirect data file access from the file server 41–43 to the storage server processor 51 and secondary storage 52. In the case of a processor 21, 22, 42 that interfaces to a user, the storage server 50 may provide the user with a notification that a time delay may be noted in accessing the requested data file. Thus, the storage server agent 121–123 has a personality that is tailored to the underlying client file server platform or environment. For example, where the file server is a database management server, the storage server agent interfaces with the database management system object manager to allow automatic migration and recall of database objects, which can be viewed as sub-files. Another example is the NetWare® file system access manager which traps any NetWare® supported file system calls at the file server. This also allows the automatic recall of migrated data files to be triggered.

Using these basic elements, numerous variations of the local area network 1 can be configured, having multiple processors 21, 22 and multiple file servers 41–43, each with their attached data storage devices 31–33. The processor 51 on which the storage server software runs includes a physical interface to the data communication link 11 of the local area network 1.

Routine Sweep Operation

Figure 5:
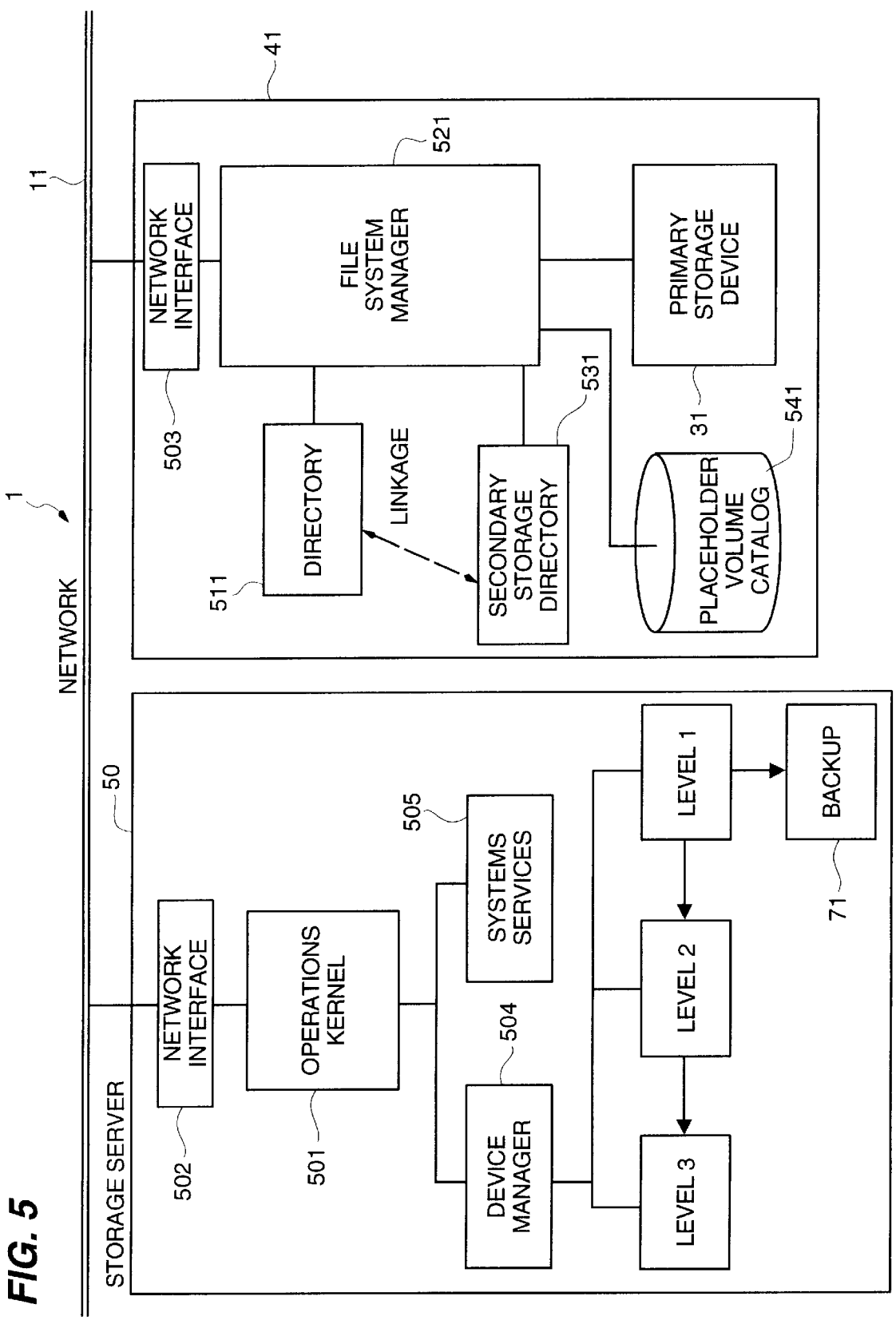
FIG. 5 illustrates in block diagram form the data file migration and backup paths taken in the data storage management system.
Figure 6:
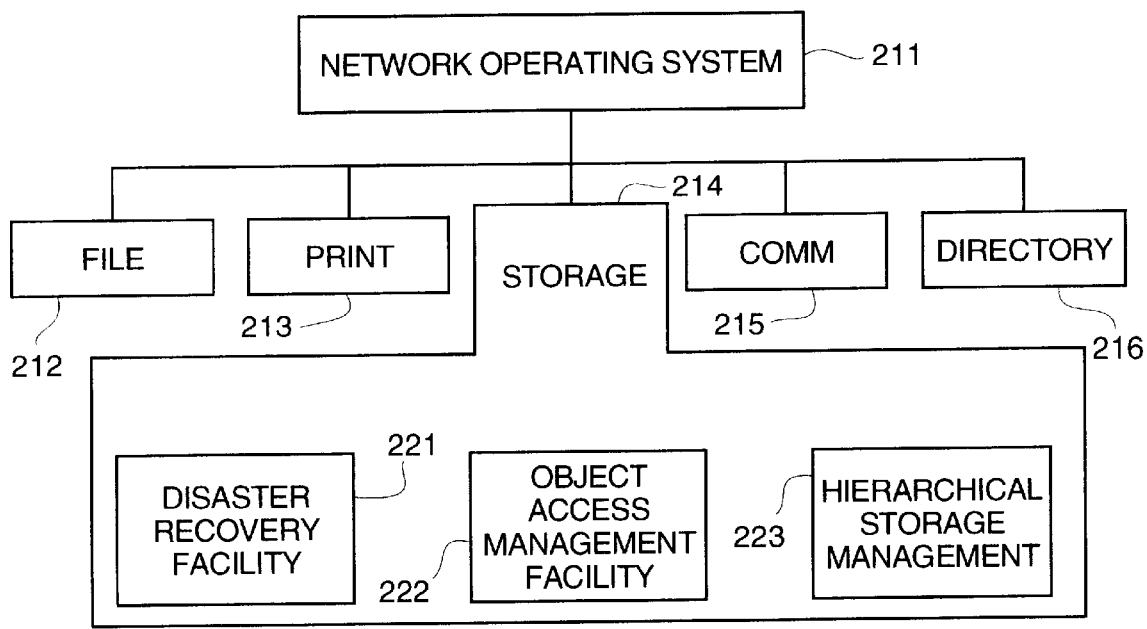
FIG. 6 illustrates in block diagram form various components of the hierarchical storage manager software.

FIG. 5 illustrates in block diagram form the data file migration and backup paths taken in the data storage management system. The device manager 504 of storage server 50 is activated by operations kernel 501 and sweeps the migration candidates from the selected managed network volume, transmits and assembles them into a transfer unit (as described below) within the top layer 311 in the secondary storage 52. The migration candidate data file is selected by the operations kernel 501 and removed from the managed volume of data storage device 31, after transmitting the data file via network interface 503, the data communication link 11 of network 1 and network interface 502 to the storage server 50 and checking that the data file has been transferred correctly. Storage server 50 thus writes the transfer unit containing the transferred data file and other data files to level 1 (311) of the secondary storage 52.

The data file is listed in the data file directory 511 of the network volume on which the processor 21 has written the data file. This directory listing is modified by the operations kernel 501 to enable the processor 21 to obtain the data file whether it is stored on the managed volume in the network volume or on a volume in the secondary storage 52. This is accomplished by the operations kernel 501 providing a "placeholder entry" in the data file directory 511 of the managed volume. This entry lists the data file as having an extent of "0" and data is provided in the directory attributes or metadata area for the data file that points to the catalog entry, created by systems services 505, in the secondary storage directory 531 that lists the relative storage location in the secondary storage 52 that contains the migrated data file. The directory of the relative location of a particular data file in secondary storage 52 is maintained in the network volume itself. This is accomplished by the use of a secondary storage directory 531 that is maintained in file server 41 by the operations kernel 501 and systems services 505 of storage server 50. The data file directory 511 and secondary storage directory 531 can both be written on the data storage device 31 of file server 41.

The use of a migration key or pointer in the placeholder entry to indicate the secondary storage directory entry for the requested data file is preferably accomplished by storing the migration key as part of the data file attributes in the file system. This enables both the placeholder entry and the secondary storage directory to survive data file renaming activity on the part of the requesting processor. File systems commonly rename data files and, if the migration key were part of the file name, it would be lost in the renaming activity. However, data file attributes are preserved as part of a data file renaming procedure. When a data file rename occurs, the name ascribed to this data file is modified and the entry in the network directory is suddenly placed in a different part of the file system primary storage directory. The data file attributes are transported in unmodified form with the new data file name and, since the placeholder entry, with its migration key, is part of the data file attributes, the newly renamed data file attributes still point to the correct secondary storage directory entry. Thus, the virtual segment of the file system automatically tracks the renaming of the data files in the primary segment of the file system.

The migrated data file is received by the storage server 50 and written at a selected available data storage space in a migration volume of a data storage device 61 in level one 311 of the secondary storage 52. In addition, if shadow volumes 64 are provided in the secondary storage 52 for data reliability purposes, the migrated data file is also written into selected available data storage space on one of the shadow volumes 64. Groups of data files stored on the shadow volumes 64 are also periodically dumped after a period of sweep activity has occurred via a special backup drive 71 on to backup media element 72 to ensure disaster recovery capability. To more efficiently manage data files in the hierarchy, the operations kernel 501 can assemble a plurality of data files into a transfer unit of predetermined size for continued migration to lower levels in the hierarchy. A candidate size for the transfer unit is a standard object size for the media that is used to implement the first layer 311 of the secondary storage 52. It is desirable that the transfer units that are used in the secondary storage 52 fit into all media with minimum boundary fragmentation.

The data files that are written to the migration volumes 61 and shadow volumes 64 have their relative storage location identification written into a secondary storage directory owned by the storage server 50. This secondary storage directory can be implemented entirely within the storage server 50, but would take up a great deal of data storage space and be difficult to protect. Instead, this secondary storage directory is distributed in the form of directory segments among the file servers 41–43 that contain managed volumes 31–33 for the processors 21, 22, with each directory segment representing the secondary storage directory 531 for the managed volume on the primary data storage device 31–33. The placeholder entry is contained in the secondary storage directory 531. Thus, the processor 21 that requests access to this migrated data file can obtain the requested data file without being aware of the existence of the secondary storage 52. This is accomplished (as described in detail below) by the storage service agent 121, which obtains placeholder entry from the data file directory 511, which points to the directory segment in the secondary storage directory 531. This identified directory segment in the secondary storage directory 531 contains the address in the migration volume that contains the requested data file.

File Systems

Figure 9:
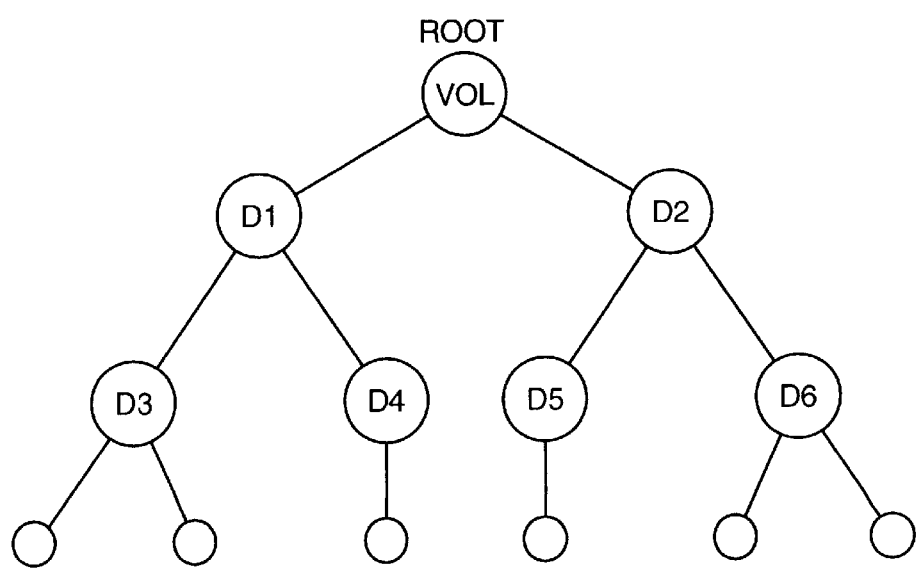
FIG. 9 illustrates a typical directory structure used by a file system.

The data management system makes use of a file system structure that provides a common repository for the potentially diverse file systems of the client file servers 41–43. The file system structure of the data management system must not only accept the data files from the file servers 41–43, but must also serve the backend data storage, data recall, data backup, data relocate and disaster recovery functions that are inherent in the data management system, wherein the media used for these functions can vary widely. The media can be an "update in place" media, such as magnetic disk, or can have only "append" capabilities, such as magnetic tape. The data file transfers are typically large in extent and must be such that data backup and data relocate operations can be performed in an efficient manner. Typical of file system architecture is a common DOS file system, whose organization is illustrated in FIG. 9. This file system has four basic components:

1. File naming convention.
2. Directory architecture, to organize data files by name so they may be easily located.
3. Physical space allocation scheme that relates data file names to physical location on a data storage media, and which allows data storage space to be utilized and reclaimed when data files are deleted.
4. File management scheme, including access methods.

For example, DOS data files are named with a 1–8 byte name and a 0–3 byte extension, which are delimited by a "." (nnnnnnnn.xxx). The directory architecture is illustrated in FIG. 9 and takes the form of a hierarchical tree of directory names. The root is typically a volume, from which a number of directories branch. Each directory includes other directories and/or data files. A full data file name is represented by concatenating all the directory tree structure components from the root to the particular data file, with components being delimited by "\". An example of such a data file name using this convention is "\vol\dir1\dir3\filename.ext". Each DOS volume on the file server has its own unique file system. The physical space allocation on the data storage media is accomplished by the use of a File Allocation Table (FAT). The data storage space on a DOS volume is segmented into allocation units termed clusters. All directory and data file names in the volume are listed in the file allocation table and hierarchically related by linkages between parents and children in the directory tree. When a data file name is entered into the file allocation table, space is also provided for data file attributes such as hidden or read-only, and the identification of the first cluster used to store the data file is also noted. If additional clusters are required to store this data file, these clusters are linked in a chain via pointers, with the entire chain representing the physical location of the data file on the data storage media.

Transfer Units

The data management system 50 of this invention makes use of a different directory structure to manage the storage of data files on the data storage media of the secondary storage 52. The storage and relocation of data files among the various layers of the secondary storage 52 is simplified by the use of transfer units. A transfer unit represents a block of data of predetermined size which contains virtual file system objects (e.g. data files) that move together to the backup system and through the hierarchy, with each transfer unit being assigned a unique identification within the data management system.

As noted above, the operations kernel 501 of the storage server processor 51 orders data files in each managed volume of the file systems 41–43 according to a predetermined algorithm. The ordering can be based on data file usage, content, criticality, size or whatever other criteria is selected. For the purpose of illustration, a simple least recently used (LRU) ordering is described. The operations kernel 501 orders the data files in each managed volume on an LRU basis and the entries on the bottom of the list represent migration candidates. The operations kernel 501 periodically sweeps the migration candidate data files from the managed volumes and assembles them serially by managed volume into a transfer unit containing a plurality of data files. The full data file name is entered into the secondary storage directory 531, together with relative data file location information: the location of the data file within the transfer unit, transfer unit identification, media object identification. The data file name is always logically related to the original transfer unit identification, the data file is never moved to another transfer unit, but remains in the transfer unit with the other temporally related data files from each virtual file system at the time of migration to secondary storage 52. The media object is itself associated with transfer units, not data files. In this manner, one directory is used to note the correspondence (relative storage location) between data files and transfer unit and a second directory located in storage server processor 51 is used to note the correspondence (physical storage location) between transfer units and media object. When transfer units are relocated from one media to another, the data file directory need not be updated since the data files remain in the original transfer unit and it is simply the change in physical location of the transfer unit on the media that must be noted.

Data File Recall

Figure 8:
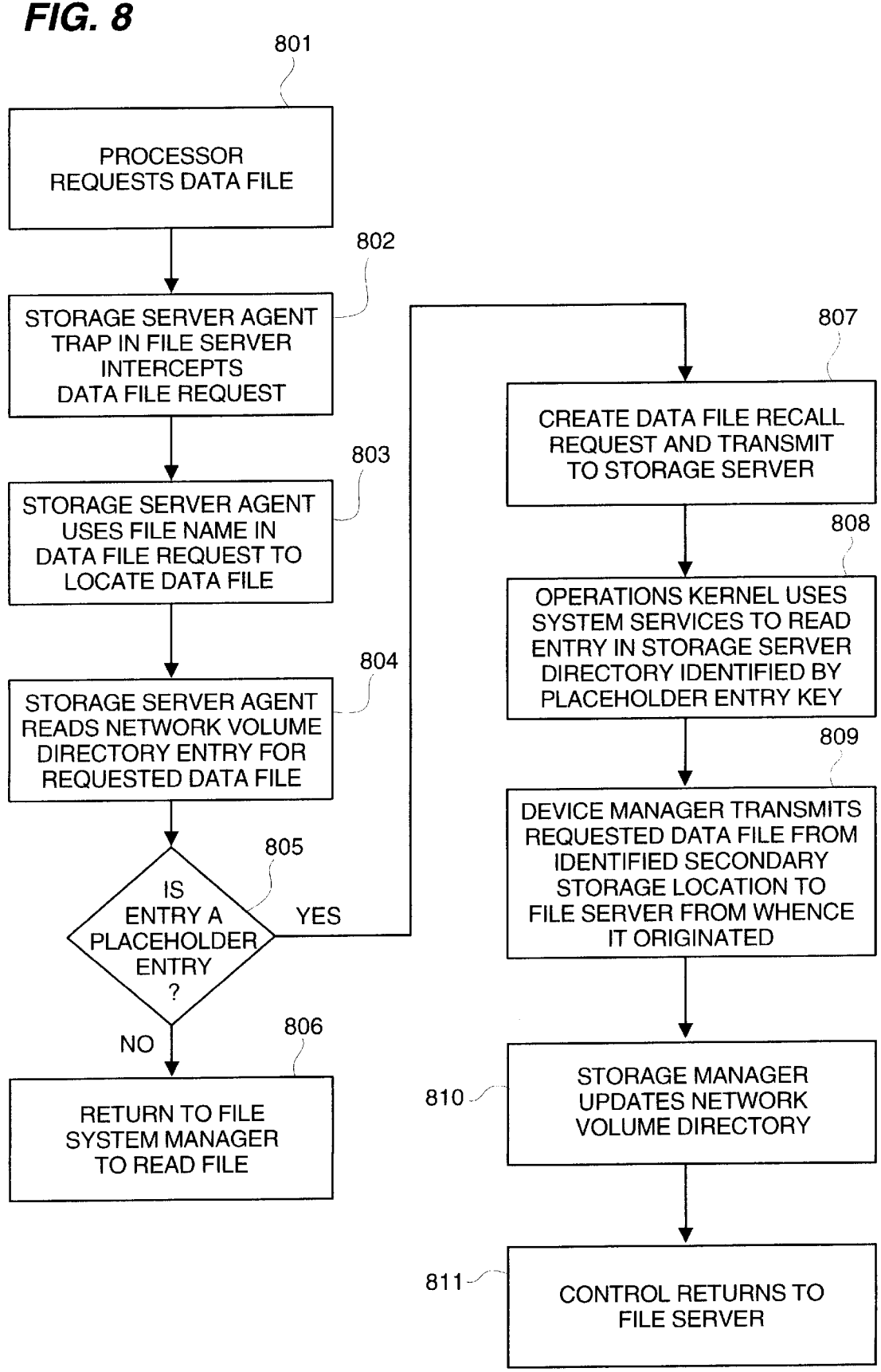
FIG. 8 illustrates in flow diagram form the file recall operation.

As illustrated in flow diagram form in FIG. 8 and with reference to the system architecture in FIG. 5, a data file recall operates in substantially the reverse direction of data file migration. As noted above, the data files that are written to the migration volumes 61 and shadow volumes 64 have their relative storage location identification written into a secondary storage directory 531 in the file server 41. The placeholder entry in data file directory 511 on the file server 41 points to this secondary storage directory segment. Thus, the processor 21 at step 801 requests access to this migrated data file and this request is intercepted at step 802 by a trap or interface 711 in the file server 41. The trap can utilize hooks in the file system 41 to cause a branch in processing to the storage server agent 121 or a call back routine can be implemented that allows the storage server agent 121 to register with the file system 41 and be called when the data file request is received from the processor 21. In either case, the trapped request is forwarded to storage server agent 121 to determine whether the requested data file is migrated to secondary storage 52. This is accomplished by storage server agent 121 at step 803 reading data file directory 511 to determine the location of the requested data file. If a placeholder entry is not found stored in data file directory 511 at step 805, control is returned to the file server 41 at step 806 to enable the file server 41 to read the directory entry that is stored in data file directory 511 for the requested data file. The data stored in this directory segment enables the file server 41 to retrieve the requested data file from the data storage device 31 on which the requested data file resides.

If at step 805, storage server agent 121 determines, via the presence of a placeholder entry, that the requested data file has been migrated to secondary storage 52, storage server agent 121 at step 807 creates a data file recall request and transmits this request together with the direct access secondary storage migration key stored in the placeholder entry via network 1 to storage server 50. At step 808, operations kernel 501 uses systems services 505 which uses the migration key to directly retrieve the entry in secondary storage directory 531. This identified entry in the secondary storage directory 531 contains the relative storage location information that consists of the transfer unit identification and position of the data file in the transfer unit. The device manager 504 uses the data file address information to recall the requested data file from the data storage device on which it is stored. This data storage device can be at any level in the hierarchy, as a function of the activity level of the data file.

Device manager 504 reads the data file from the relative storage location identified in the secondary storage directory 531 and places the retrieved data file on the network 1 for transmission to the file server 41 and volume 31 that originally contained the requested data file. This is accomplished by translating the relative storage location information into an identification of the exact physical storage location in secondary storage 52 that contains the requested data file. The data file is then read out of this identified physical storage location. Systems services 505 of operations kernel 501 then updates the data file directory 511 to indicate that the data file has been recalled to the network volume. At step 811, control is returned to file server 41, which reads data file directory 511 to locate the requested data file. The data file directory 511 now contains information that indicates the present location of this recalled data file on data storage device 31. The processor 21 can then directly access the recalled data file via the file server 41.

Movable Placeholders

The placeholders noted above are movable, in that the data storage management system 50 provides the capability to move and/or copy the placeholder files from one file server volume to another file server volume, even if the destination file server volume resides on a different file server. This is accomplished by the use of unique and immutable migration keys which are included in the placeholder entries to identify the location of the associated data file with absolute certainty. Since the system users and administrators can rename storage server, the unique storage server identifier includes timestamp data which relates the storage server name with a specific point in time, which enables the data storage management system 50 to accurately track the present identity of the storage server.

In addition, a duplicate copy of the placeholder catalog file is maintained in the data storage management system 50 to prevent loss of file system integrity in the event that the active placeholder catalog file is corrupted. This placeholder data is maintained in a placeholder volume catalog 541 which provides users with a file-system-like view of the placeholder files which reside on the selected file system volume. The placeholder volume catalogs 541 are not used for file access purposes, but, instead, are used to ensure that placeholder restoration can be accomplished in the event that the placeholders are corrupted and to provide the users with data volume content viewing. Each placeholder volume catalog 541 resides on the file server to which it pertains and tracks the placeholders for all HSM servers. In this manner, the integrity of the placeholders is ensured.

Storage Server Identifier

Once placeholders are allowed to be moved by the users to file server volumes that are managed by other storage servers, a mechanism is required that can uniquely identify the storage server to which the placeholder data has been transferred or copied. This identifier is included in the placeholder data which is scattered across numerous placeholder files and therefore must be immutable in nature. The name of the storage server is an inadequate identifier, since the name can be changed over time. The identifier used in the present data storage system comprises a combination of the storage server name and timestamp created by the operating system, which results in a unique identifier. The timestamp is typically the exact time that the identifier is created, so that the storage server identifier is uniquely mapped to a physical entity via the timestamp data. Once created, the identifier is never modified, since any modification would destroy the immutability of the identifier.

Placeholder Data

The placeholder data maintained in the data storage management system extended attributes for a data file which has been migrated comprises for example, as shown in FIG. 2, the following data items:

Placeholder Version—the version of the placeholder data format

Placeholder Flags—internal flags for placeholder operation

Storage Server Identifier—a pointer which identifies the Storage Server that holds the migrated data for this placeholder file Transfer Unit Identifier—an identification of the transfer unit which contains the migrated data for this placeholder file Location—an identification of the location within the transfer unit that contains the migrated data for this placeholder file Secondary Size—the size in bytes of the data which was migrated to secondary storage for this placeholder file Primary Size—the size in bytes of the original data file for this placeholder file Modify Stamp—the date and time of the last modification to this data file prior to the initial migration of this version of the data file Access Stamp—the date and time of the last access to this data file prior to the initial migration of this version of the data file Migrate Stamp—the date and time of the initial migration of this version of the data file Recall Count—the number of times that of this version of the data file has been recalled Verification Size—the number of bytes of the verification data that are to be used for recall verification of this data file Verification Data—this data represents information which is used to ensure that the correct data file is being recalled

Placeholder Volume Catalogs

For each managed file server volume in primary storage, a placeholder volume catalog 541 is maintained that provides a file-system-like view of the placeholder files which are stored on the file server volume. The placeholder volume catalog 541 is not required for data access, since it is used solely for user viewing and placeholder restoration. Each placeholder volume catalog 541 resides on the file server volume to which it pertains, and is not mirrored on the storage server 50.

The placeholder volume catalog 541 tracks all placeholder files for all file servers and therefore enables a user to view, in hierarchical fashion, a catalog of all data files migrated from a selected file server volume. These data files include data files whose placeholders have been deleted, but whose data still resides in secondary storage, including all past migrated versions of the data file. The placeholder volume catalog 541 therefore represents a complete history of data file activity on the associated file server volume for all data files still resident within the data storage subsystem. This history attribute of the placeholder volume catalog 541 enables the data management system 50 to restore both corrupted and deleted placeholder files.

Recall Initiator

The ability to move placeholders from one file server volume to another file server volume makes the job of cleaning up orphaned placeholders from media and overflow transfer unit discard operations more difficult. An orphaned placeholder is created when a recall operation has been attempted on a placeholder that points to a data file that has been discarded from the secondary storage. The recall initiator process resident on the storage server agent 121–123 scans a file server volume, removing any orphaned placeholders as they are encountered. As orphaned placeholders are encountered, the recall initiator process also deletes the corresponding placeholder data from the volume catalog.

Summary

The data storage management system provides the capability to move and/or copy the placeholder files from one file server volume to another file server volume, even if the destination file server volume resides on a different file server. This is accomplished by the use of unique and immutable migration keys which are included in the placeholder entries to identify the location of the associated data file with absolute certainty. In addition, a duplicate copy of the placeholder catalog file is maintained in the system to prevent loss of file system integrity in the event that the active placeholder catalog file is corrupted. This placeholder data is maintained in a placeholder volume catalog which provides users with a file-system-like view of the placeholder files which reside on the selected volume.

We claim:

1. A data storage management system for a data network which functions to interconnect a plurality of file servers, each of which stores data files in a plurality of file server volumes, said data storage management system comprising:

directory means, located in each of said plurality of file servers, for identifying a storage location in said plurality of file server volumes of each data file stored on said file server;

secondary storage means for storing data files migrated from said plurality of file servers;

storage server means connected to said network for automatically managing transfer of data files between said plurality of file servers and said secondary storage means, comprising:

means for migrating selected data files from said plurality of file servers to said secondary storage means, means for writing in said directory means at a file server volume directory location for each of said migrated selected data files, placeholder data indicating that said migrated selected data file has been migrated to said secondary storage means, and means, responsive to a one of said migrated selected data files being transferred from a first of said plurality of file server volumes on a selected file server to a second of said plurality of file server volumes on a one of said plurality of file servers, for transferring said placeholder data, written in said directory means at a file server volume directory location for said migrated selected data file on said selected file server, to a said directory means at a file server volume directory location for said migrated selected data file on a one of said plurality of file servers associated with said second of said plurality of file server volumes.

2. The system of claim 1 wherein said storage server means further comprises:

means for storing data indicative of a physical data storage location that identifies a locus in said secondary storage means of each of said selected data files migrated to said secondary storage means.

3. The system of claim 2 further comprising:

means, located in each of said plurality of file servers, for intercepting a call at a selected file server to a data file that has been stored in said file server;

means, responsive to said placeholder data written in said directory means, for recalling said requested data file from said secondary storage means to said file server, comprising:

means for reading said placeholder data stored in said directory means to identify a physical data storage location in said storing means that contains data which identifies a locus in said secondary storage means of said requested migrated data file, means for retrieving said data stored in said identified physical storage location in said storing means, and means, responsive to said retrieved data, for transmitting said requested migrated data file from said locus in said secondary storage means to said selected file server.

4. The system of claim 1 wherein said placeholder data, written by said writing means in said directory means, is stored as part of the data file attributes.

5. The system of claim 1 wherein said storage server means further comprises:

means, responsive to said means for writing said placeholder data, for writing a copy of said placeholder data into a volume catalog for all data files migrated from said file server volume to said secondary storage means.

6. The system of claim 5 further comprising:

means for enabling a user to recall said placeholder data stored in said volume catalog.

7. The system of claim 2 wherein said secondary storage means comprises:

a multi-layer hierarchical memory, wherein said layers in said hierarchical memory comprise media of differing characteristics.

8. The system of claim 7 wherein said storage server means further comprises:

means for collecting a plurality of data files, that are transmitted to said secondary storage means, into a transfer unit;

means for storing said transfer unit on a first layer of said hierarchy.

9. The system of claim 8 wherein said means for storing data comprises:

media object directory means for storing data indicative of a correspondence between a transfer unit and a media on which said transfer unit is located.

* * * * *